United States Patent
Nomoto et al.

(10) Patent No.: US 12,400,280 B2
(45) Date of Patent: Aug. 26, 2025

(54) SIGHTSEEING PLAN PROVISION SYSTEM AND SIGHTSEEING PLAN PROVISION METHOD

(71) Applicant: TOYOTA JIDOSHA KABUSHIKI KAISHA, Aichi-ken (JP)

(72) Inventors: Miki Nomoto, Nagoya (JP); Yuka Nishiyama, Toyota (JP); Kenichi Okumura, Gotemba (JP); Ryota Tomizawa, Mishima (JP); Tatsuya Sugano, Shizuoka-ken (JP); Yushi Seki, Kanagawa-ken (JP); Tokuhiro Masui, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 24 days.

(21) Appl. No.: 18/331,178

(22) Filed: Jun. 8, 2023

(65) Prior Publication Data
US 2024/0054583 A1  Feb. 15, 2024

(30) Foreign Application Priority Data
Aug. 9, 2022  (JP) .................................. 2022-127124

(51) Int. Cl.
*G06Q 50/14* (2012.01)
*G06Q 10/02* (2012.01)
(Continued)

(52) U.S. Cl.
CPC ............. *G06Q 50/14* (2013.01); *G06Q 10/02* (2013.01); *G06Q 20/102* (2013.01); *G06Q 50/40* (2024.01)

(58) Field of Classification Search
CPC ........ G06Q 50/14; G06Q 50/40; G06Q 10/02; G06Q 20/102
See application file for complete search history.

(56) References Cited

U.S. PATENT DOCUMENTS

2014/0046585 A1* 2/2014 Morris, IV ........... G06Q 10/047
701/400
2017/0370744 A1 12/2017 Miyajima
(Continued)

FOREIGN PATENT DOCUMENTS

DE  102013225019 A1 * 6/2015 ............. G01C 21/34
JP  4609886 * 1/2011 ............. G01C 21/00
(Continued)

OTHER PUBLICATIONS

Lock, Clara, "Coronavirus: No tourists? Travel agencies take the chance to regroup," The Straits Times, Singapore, Apr. 5, 2020.*

*Primary Examiner* — Nathan Erb
(74) *Attorney, Agent, or Firm* — HAUPTMAN HAM, LLP

(57) ABSTRACT

The sightseeing plan provision system includes a communication terminal and a server. The communication terminal is operated by a user who is traveling for purposes other than tourism. The server includes a processor and a storage device, and presents a sightseeing plan to the user. The processor automatically generates a new sightseeing plan based on the travel route planning information so as to include a desired stop-by spot of the user in response to a request of the user operating the communication terminal. Then, the processor registers the generated new sightseeing plan in the database of the storage device.

10 Claims, 4 Drawing Sheets

(51) Int. Cl.
*G06Q 20/10* (2012.01)
*G06Q 50/40* (2024.01)

(56) References Cited

U.S. PATENT DOCUMENTS

| | | | |
|---|---|---|---|
| 2018/0157262 A1 | 6/2018 | Ao et al. | |
| 2019/0086223 A1* | 3/2019 | Tanaka | G06F 16/00 |
| 2020/0208998 A1* | 7/2020 | Xiang | G06F 16/29 |
| 2020/0211043 A1* | 7/2020 | Hori | G08G 1/0112 |
| 2020/0249033 A1* | 8/2020 | Gelhar | G01C 21/343 |
| 2020/0258170 A1* | 8/2020 | Schlank | G06Q 50/14 |
| 2020/0379079 A1* | 12/2020 | Dupray | H04W 64/00 |
| 2021/0133795 A1* | 5/2021 | Desai | G06Q 30/0239 |

FOREIGN PATENT DOCUMENTS

| | | | | |
|---|---|---|---|---|
| JP | 4968903 | * | 7/2012 | ............ G01C 21/36 |
| JP | 5448827 | * | 3/2014 | ............ G01C 21/34 |
| JP | 2015-21836 | * | 2/2015 | ............ G01C 21/34 |
| JP | 2018-091711 A | | 6/2018 | |
| JP | 2021-9063 | * | 1/2021 | ............ G01C 21/26 |
| JP | 2021-009063 A | | 1/2021 | |
| WO | WO 2007/007374 A1 | * | 1/2007 | ............ G01C 21/52 |
| WO | 2016/121174 A1 | | 8/2016 | |
| WO | 2017/199415 A1 | | 11/2017 | |

\* cited by examiner

SIGHTSEEING PLAN PROVISION SYSTEM AND SIGHTSEEING PLAN PROVISION METHOD

CROSS-REFERENCE TO RELATED APPLICATION

This application claims priority to Japanese Patent Application No. 2022-127124 filed on Aug. 9, 2022, incorporated herein by reference in its entirety.

BACKGROUND

1. Technical Field

The present disclosure relates to a sightseeing plan provision system and a sightseeing plan provision method.

2. Description of Related Art

WO 2017/199415 discloses a display control system. The display control system determines a display order of a sightseeing plan to be presented to a user based on an attribute of an evaluator who evaluates the sightseeing plan, an evaluation result of the sightseeing plan, and an attribute of the user who has made a presentation request of the sightseeing plan.

SUMMARY

It is considered that travelers who are traveling for a non-sightseeing purpose include a traveler who considers to go sightseeing utilizing an opportunity of movement of the travel. However, it is troublesome and cumbersome for the traveler to appropriately decide what kind of sightseeing plan to be used for sightseeing during the travel. Further, it is useful for the traveler who is traveling when a sightseeing plan generated for another traveler can be presented to the traveler who is traveling. However, it is also troublesome and cumbersome for the traveler himself/herself to register the sightseeing plan presented in this manner.

The present disclosure has been made in view of the above-described problems, and an object of the present disclosure is to provide a sightseeing plan provision system and a sightseeing plan provision method capable of presenting a highly convenient sightseeing plan to a traveler who is traveling for a non-sightseeing purpose while labor and troublesomeness of the traveler are reduced.

A sightseeing plan provision system according to the present disclosure includes: a communication terminal; and a server. The communication terminal is operated by a user who is on a trip for a non-sightseeing purpose. The server includes a processor and a storage device, and presents a sightseeing plan to the user.
The processor automatically generates a new sightseeing plan based on route planning information of the trip so as to include a desired stop-by spot of the user in response to a request of the user who operates the communication terminal.
The processor registers the new sightseeing plan that is generated in a database of the storage device.
One or more sightseeing plans that the server presents to the user may include at least one of the new sightseeing plan and a registered sightseeing plan.
The registered sightseeing plan has been generated and registered in past in response to a request from another user or the user and includes the desired stop-by spot of the user.

When the user who operates the communication terminal selects one of the one or more sightseeing plans presented to the user, the processor may automatically reserve a reservation target included in the selected sightseeing plan.

The reservation target may include an autonomous vehicle that matches the selected sightseeing plan.

The server may execute a process of paying a reward from the reservation target to the other user or the user related to registration of the sightseeing plan including the reservation target that is automatically reserved.

A sightseeing plan provision method according to the present disclosure provides a sightseeing plan to a user who is on a trip for a non-sightseeing purpose.
The sightseeing plan provision method includes:
automatically generating a new sightseeing plan based on route planning information of the trip so as to include a desired stop-by spot of the user in response to a request of the user who operates a communication terminal; and
registering the new sightseeing plan that is generated in a database.

According to the present disclosure, it is possible to present a highly convenient sightseeing plan to a traveler who is traveling for a non-sightseeing purpose while the labor and troublesomeness of the traveler are reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
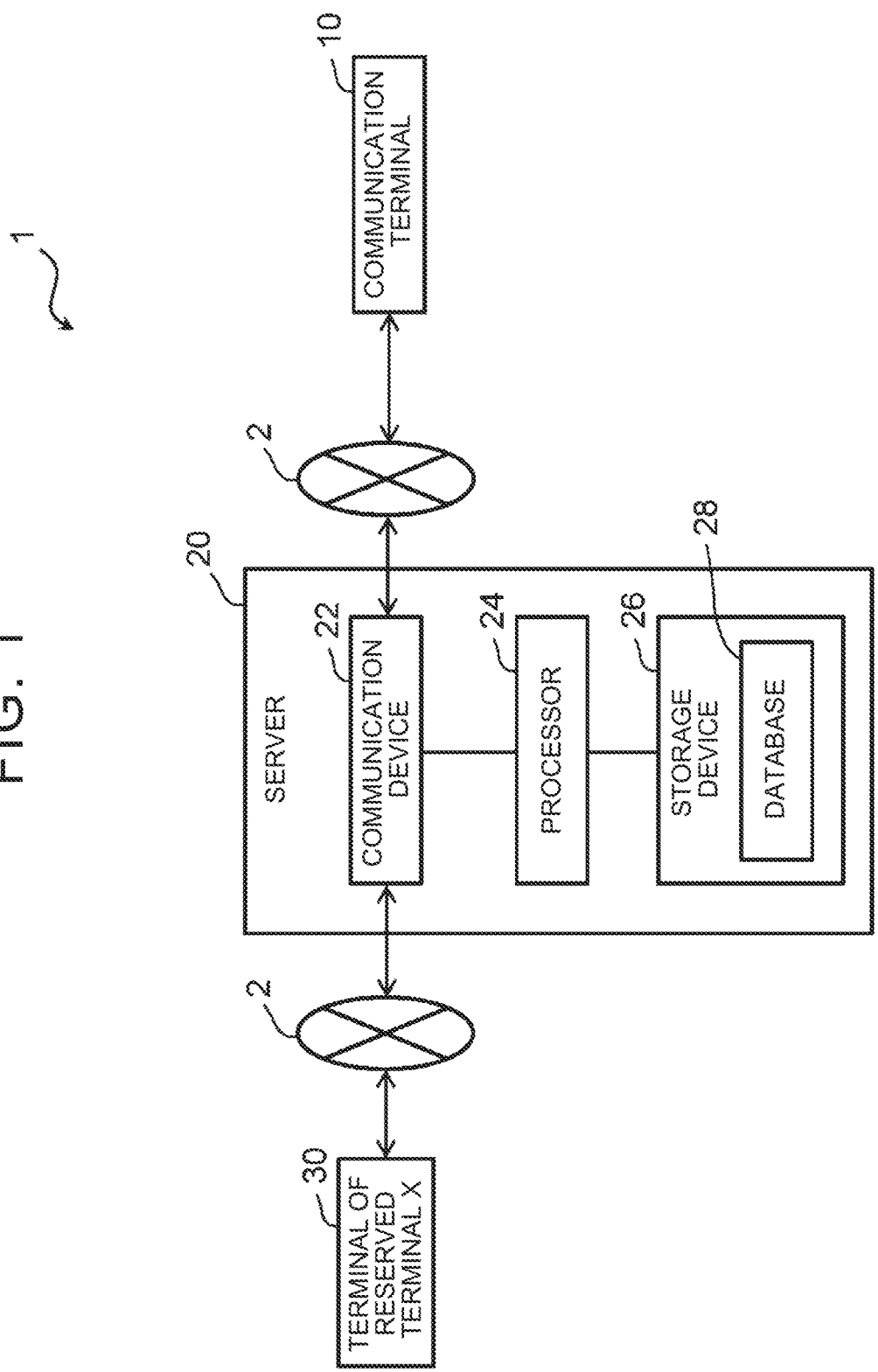
FIG. 1 is a diagram illustrating an example of a configuration of a sightseeing plan provision system according to an embodiment.

Hereinafter, embodiments of the present disclosure will be described with reference to the accompanying drawings.
1. Structure of Sightseeing Plan Provision System
FIG. 1 is a diagram illustrating an example of a configuration of a sightseeing plan provision system 1 according to an embodiment. The sightseeing plan provision system (hereinafter, also simply referred to as "provision system") 1 is used by a user such as a user U who performs a trip T for a purpose other than tourism. Here, the "trip T" is, for example, a trip intended for a ceremony.

The provision system 1 is configured to provide the sightseeing plan P to the user U during the trip T. More specifically, the provision system 1 receives the request of the user U in the trip T by using the vehicle according to the route plan of the trip, and provides the sightseeing plan P. "Vehicle" as used herein includes, for example, an automobile, a bicycle, a bus, a train, a Shinkansen, and an airplane. The automobile includes an autonomous vehicle.

The provision system 1 includes a communication terminal 10, a server 20, and a reservation target terminal 30.

The communication terminal 10 is operated by the user U during the trip T. The communication terminal 10 includes a processor, a storage device, and a communication device. In addition, the communication terminal 10 can acquire the position information of the communication terminal 10 (that is, the position information of the user U) based on the signals from Global Navigation Satellite System (GNSS satellites).

The communication terminal 10 is, for example, a mobile terminal such as a smartphone or a tablet-type personal computer carried by the user U. Further, for example, when the user U is moving on the vehicle, the communication terminal 10 may be an in-vehicle terminal mounted on the vehicle. The in-vehicle terminal is, for example, a navigation device. Further, in an example of an in-vehicle terminal mounted on an autonomous vehicle, the in-vehicle terminal may include a processor that generates a route plan for autonomous driving.

The provision system 1 includes not only a communication terminal 10 (see FIG. 1) operated by a user U who is one of users using the provision system 1 but also one or a plurality of communication terminals (not shown) of other users.

The server 20 is a computer that executes various kinds of processing. The various processes described here are various processes related to presentation and management of the sightseeing plan P and processes associated therewith. The various processes include, for example, a "plan generation process", a "plan registration process", an "automatic reservation process", and a "reward payment process", which will be described later.

The server 20 includes a communication device 22, a processor 24, and a storage device 26. The communication device 22 communicates with the communication terminal 10 and a terminal 30 described later via a communication network 2 such as wireless communication. The processor 24 executes the various processes described above. The storage device 26 stores various types of information. The storage device 26 includes a database 28 that stores information of a plurality of sightseeing plans P generated in response to a request from a user such as the user U. Examples of the storage device 26 include volatile memory, non-volatile memory, Hard Disk Drive (HDD), and Solid State Drive (SSD). When the processor 24 executes various computer programs, various kinds of processing by the server 20 are realized. The various computer programs are stored in the storage device 26 or recorded in a computer-readable recording medium. Note that a plurality of processors 24 and a plurality of storage devices 26 may be provided.

The terminal 30 is a terminal owned by each individual or group that manages the "reservation target X" described later. The terminal 30 is, for example, a personal computer or a smartphone. The terminal 30 includes a processor, a storage device, and a communication device. In FIG. 1, only one terminal 30 is exemplarily shown.

2. Various Types of Processing by the Sightseeing Plan Provision System

The user U utilizing the service provided by the provision system 1 enters the personal information that identifies the user U, such as the name and e-mail address, by launching a dedicated application using the communication terminal 10 to register as a member of the application. Then, the user U who has completed the member registration can request the presentation of the sightseeing plan P by operating the communication terminal 10 during the trip T.

The server 20 (processor 24) executes a "plan generation process". The plan generation process is executed in response to a request from the user U who operates the communication terminal 10. According to the plan generation process, a new sightseeing plan Pn is automatically generated based on the route planning information Irp of the trip T so as to include one or more desired stop-by spot Srq. The desired stop-by spot Srq is an essential tourist destination desired by the user U.

The generated new sightseeing plan Pn may be registered in the data base 28 of the storage device 26 by a "plan registering process" described later. Registered sightseeing plan Po previously generated and registered in response to a request from another user or the user U is also registered in the data base 28.

Figure 2:
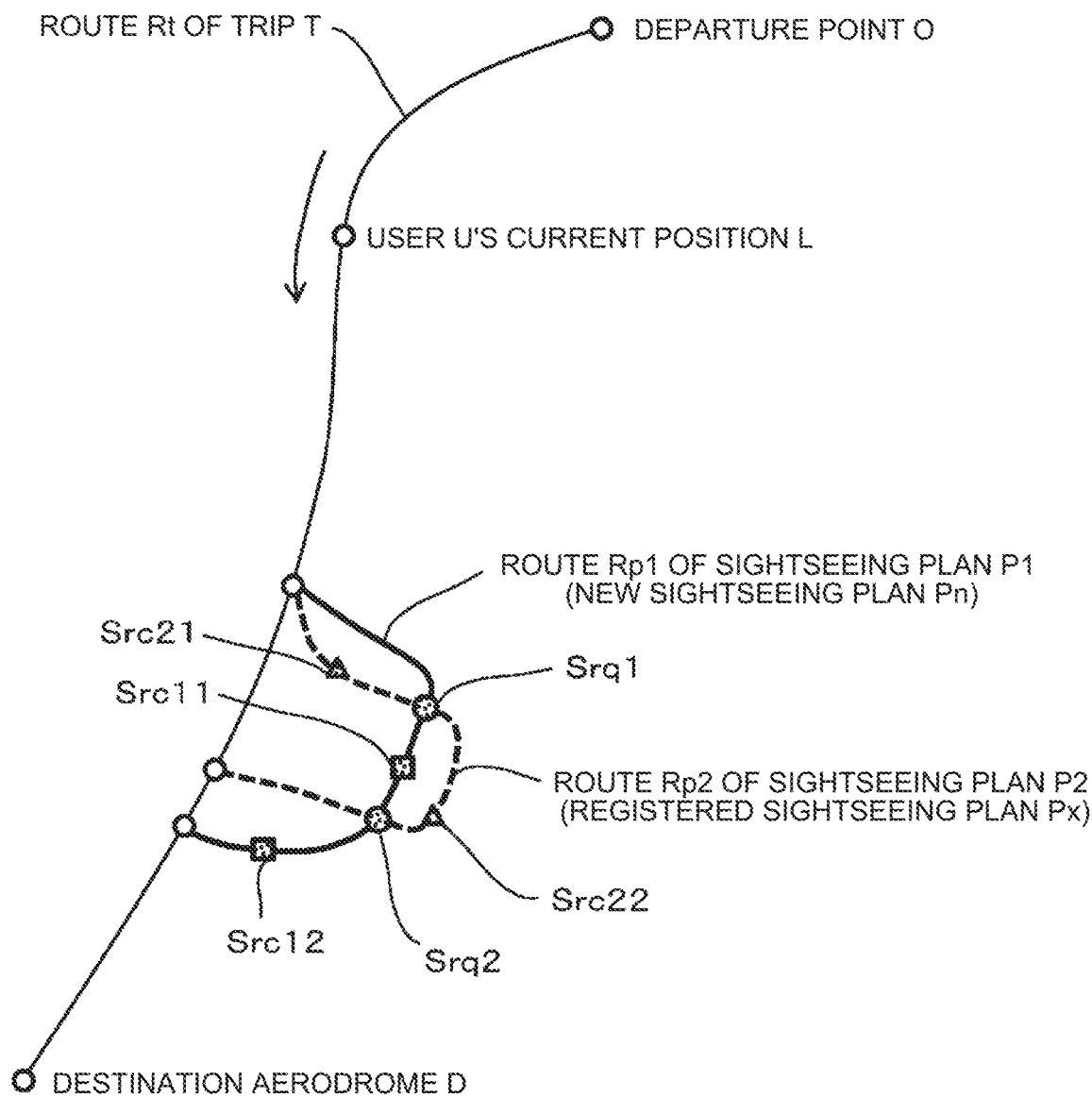
FIG. 2 is a diagram conceptually illustrating an overview of the sightseeing plan P provided by the server according to the embodiment.

Specifically, FIG. 2 is a diagram conceptually illustrating an overview of the sightseeing plan P provided by the server 20 according to the embodiment. As mentioned above, trip T is a travel for purposes other than tourism. FIG. 2 illustrates an exemplary route Rt of the trip T by the user U. The route Rt is generated based on the route planning of the trip T generated by the communication terminal 10, and is a route from the departure point O of the trip T to the destination D. The route planning is generated based on information (input information It) input to the communication terminal 10 by the user U. The input information It includes at least a departure point O and a destination D. The input information It may include, for example, at least one of a departure time of the departure point O and an arrival time of the destination D as other information. The period of trip T is one day or more days.

In addition, the route Rt of the trip T is generated based on a route plan generated by an in-vehicle terminal (for example, a navigation device or an in-vehicle terminal including a processor for autonomous driving) corresponding to the communication terminal 10, for example, when the user U uses the vehicle during the trip. The route Rt is generated based on, for example, a route plan generated by the communication terminal 10, which is a mobile terminal of the user U, when using a public transportation facility such as a bus, a train, or an airplane.

FIG. 2 shows the current location L of the user U moving along the route Rt. FIG. 2 corresponds to an example in which the user U utilizes the provision system 1 in the current location L to conduct tourism by taking advantage of the opportunity of trip T.

As described above, the plan generation process is a process of automatically generating a new sightseeing plan Pn including one or more desired stop-by spot Srq inputted to the communication terminal 10 by the user U. Specifically, the user U operates the communication terminal 10 to request the provision system 1 (the server 20) to generate a new sightseeing plan Pn. The information (input information Ip) transmitted by the user U to the server 20 for generation of the new sightseeing plan Pn is one or a plurality of desired stop-by spot Srq (indispensable tourist destinations for the user U) desired by the user U. The desired stop-by spot Srq is, for example, a store such as a restaurant and a shopping store, a facility such as an art museum, and a famous place such as a historic site. In FIG. 2, two desired stop-by spot Srq1 and Srq2 are illustrated as the desired stop-by spot Srq.

The sightseeing plan P presented to the user U may include not only the desired stop-by spot Srq entered by the user U but also a stop-by spot (recommended stop-by spot) Src recommended by the server 20 to the user U. The recommended stop-by spot Src can be specified by, for example, the following method. That is, the information of the famous tourist spot is stored in the database 28 of the storage device 26 in advance. Then, the servers 20 select a sightseeing spot located in the vicinity of the desired stop-by spot Srq among the famous sightseeing spots stored in the database 28 as a recommended stop-by spot Src.

Database 28 stores registered sightseeing plan Po previously generated and registered in response to requests from other users or users U. Here, the sightseeing plan P including the desired stop-by spot Srq of the user U among the registered sightseeing plan Po is referred to as "registered sightseeing plan Px". The one or more sightseeing plans P presented to the user U from the servers 20 include at least one of a new sightseeing plan Pn generated in response to a request from the user U and a registered sightseeing plan Px.

In the embodiment illustrated in FIG. 2, the sightseeing plan P presented to the user U by the servers 20 is two sightseeing plan P1 and P2. The sightseeing plan P1 is a new sightseeing plan Pn generated in response to a request from the user U. The sightseeing plan P1 includes a desired stop-by spot Srq1 and Srq2, as well as recommended stop-by spot Src11 and Src12. On the other hand, the sightseeing plan P2 is a registered sightseeing plan Px. The sightseeing plan P2 includes a desired stop-by spot Srq1 and Srq2, as well as recommended stop-by spot Src21 and Src22.

The generation of the sightseeing plan P includes generation of route Rp of the sightseeing plan P. Specifically, the route Rp is generated based on the route planning information Irp which is information of the route planning described above with respect to the trip T. The route planning information Irp includes, for example, information of a route Rt and information of a vehicle used for moving the user U together with the input information It described above. In addition, for generating the route Rp, the servers 20 may acquire the route planning information Irp in the following manner, for example. That is, in a case where the user U is moving using a public transportation facility such as a train or an airplane during the trip T, the moving speed and the moving direction of the user U may be calculated from the position information (the position information of the user U) of the communication terminal 10 acquired in the communication terminal 10. When information on the position, movement speed, and movement direction of user U can be obtained in this way on the map, the vehicle utilized by user U can be estimated from these information, and furthermore, the use convenience of the vehicle can be estimated. From the information estimated in this way, the information on the route Rt of the trip T by the user U and the information on the vehicle may be acquired as the route planning information Irp.

More specifically, based on the route planning information Irp, the route Rp1 is formed to diverge from the route Rt as shown in FIG. 2 and to merge back into the route Rt after passing through the desired stop-by spots Srq1 and Srq2 and the recommended stop-by spots Src11 and Src12. In addition, in the generation of the route Rp1, the order of passing through the stop-by spots Srq1, Srq2, Src11 and Src12 is determined, for example, so that the route Rpt is the shortest. Also, the order may be determined such that the trip Times along the route Rp1 are shortest, for example. Similar to the route Rp1, the route Rp2 is also formed to diverge from the route Rt and re-merge into the route Rt after passing through the desired stop-by spots Srq1 and Srq2 and the recommended stop-by spot Src21 and Src22. Note that the branch points and the junction points of the route Rp1 and Rp2 with respect to the route Rt do not necessarily have to be different, and may be the same point.

Plan Registration Process

The server 20 (processor) 22 executes a "plan registering process" for registering the new sightseeing plan Pn generated by the plan generating process in the database 28 of the storage device 26. More specifically, the enrollment of the new sightseeing plan Pn is performed provided that the user U is authorized. This is registered in association with ID of the user (user U or another user) who has requested the generation of the new sightseeing plan Pn. In the embodiment illustrated in FIG. 2, the new sightseeing plan P1 is registered by the plan registering process.

Automatic Reservation Processing

When one of the one or more sightseeing plans P (that is, at least one of the new sightseeing plan Pn and the registered sightseeing plan Px) presented to the user U is selected by the user U operating the communication terminal 10, the server 20 (processor) 22 automatically reserves one or more "reservation targets X" included in the selected sightseeing plan P. Here, the reservation target X includes, for example, a store such as a restaurant, an accommodation place, a sightseeing facility, a ticket of an event, and a vehicle for moving a route Rp.

The reservation target X may include an autonomous driving vehicle that matches the sightseeing plan P selected by the user U. The autonomous vehicle may include a Mobility as a Service (Maas) vehicle. More specifically, the database 28 of the server 20 may store, for example, information of autonomous vehicles of various vehicle types. The information of the autonomous driving vehicle may be stored in the database 28 in a state in which the autonomous driving vehicle of the vehicle type corresponding to each sightseeing plan P is associated with the sightseeing plan P in advance. When the reservation target X is a vehicle, the autonomous reservation of the autonomous vehicle associated in this way may be performed.

Remuneration Processing

The server 20 (processor 24) executes a process of paying a reward from the reservation target X to a user (user U or another user) related to the registration (posting) of the sightseeing plan P including the reservation target X that is automatically reserved by the automatic reservation process. The "reward" here is, for example, a reward point having a monetary value. Alternatively, the reward may be, for example, electronic money.

Flowchart

Figure 3:
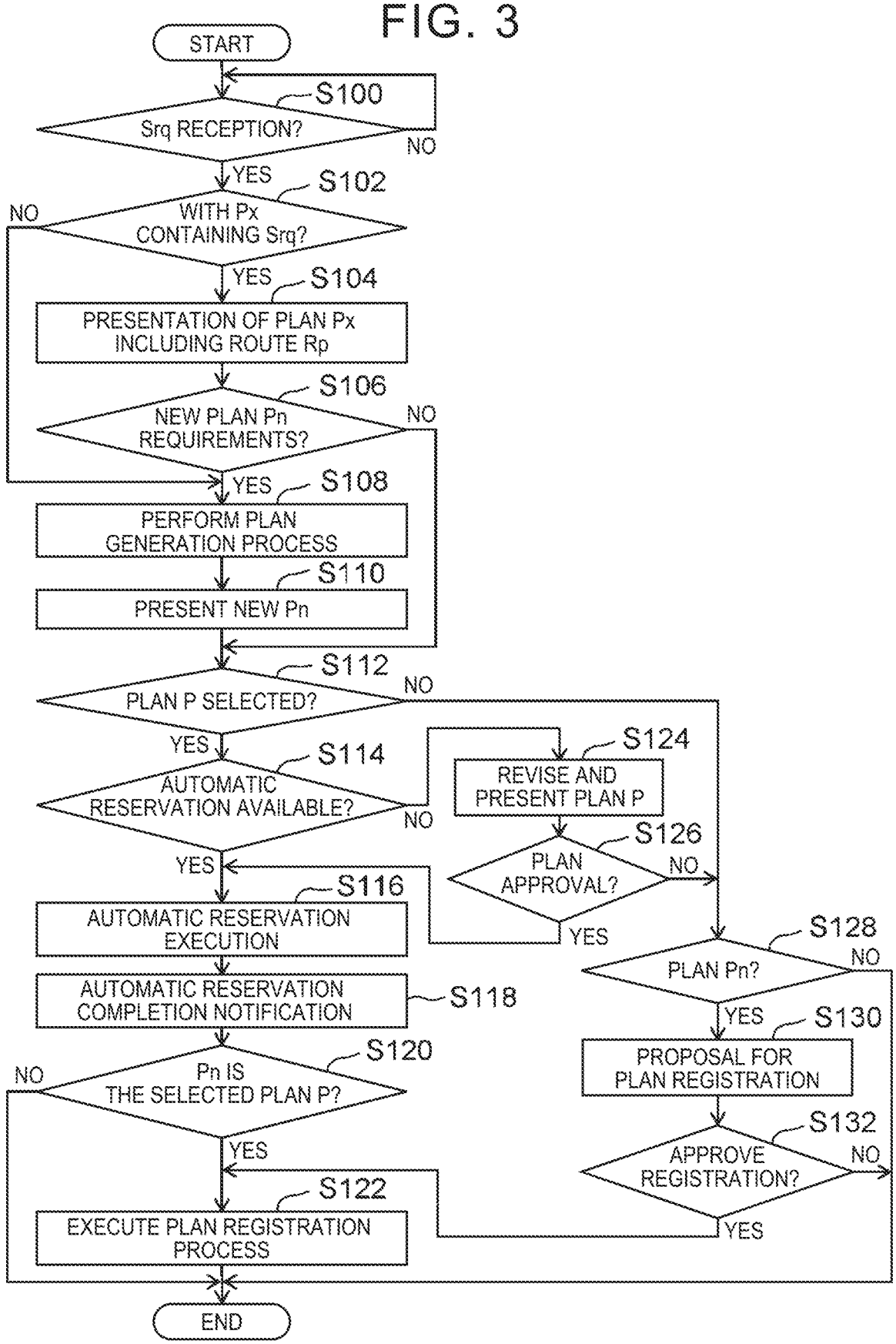
FIG. 3 is a flowchart illustrating processing related to presentation and management of the sightseeing plan P according to the embodiment.

FIG. 3 is a flowchart illustrating processing related to presentation and management of the sightseeing plan P according to the embodiment.

In S100, the server 20 (processor 24) determines whether one or more desired stop-by spot Srq have been received from the communication terminal 10 operated by the user U. Consequently, if one or more desired stop-by spot Srq are received, the process proceeds to S102.

In S102, the servers 20 determine whether one or more registered sightseeing plan Px including one or more desired stop-by spot Srq received in S100 are registered in the database 28. Consequently, if the one or more registered sightseeing plans Px are registered in the database 28, the process proceeds to S104. On the other hand, if S102 determination is No, the process proceeds to S108.

In S104, the server 20 acquires the route planning information Irp of the trip T currently performed by the user U from the communication terminal 10, and generates the route Rp for each of the one or more registered sightseeing plan Px extracted by S102 based on the route planning information Irp (for example, refer to the route Rp2 in FIG. 2). Then, the servers 20 transmit one or more registered sightseeing plan Px including the generated route Rp to the communication terminal 10, thereby presenting the one or more registered sightseeing plan Px to the user U. One or more registered sightseeing plan Px (including route Rp) presented to the user U are displayed on the communication terminal 10.

Next, in S106, the servers 20 communicate with the communication terminals 10 to determine whether or not the user U is requesting the generation of a new sightseeing plan Pn. As a result, when the determination result is Yes, the process proceeds to S108. On the other hand, if the determination is No, the process proceeds to S112.

In S108, the servers 20 acquire the route planning information Irp of the trip T currently performed by the user U from the communication terminal 10, and then execute the plan generation process described above. Thus, in response to the user U's request, one or more new sightseeing plan Pn including one or more desired stop-by spot Srq received at S100 are generated. Each of the generated one or more new sightseeing plan Pn includes a route Rp (e.g., see route Rp1 in FIG. 2) based on the route planning information Irp.

Then, in S110, the servers 20 present the one or more new sightseeing plan Pn to the user U by transmitting the one or more new sightseeing plan Pn generated in S108 to the communication terminal 10. The one or more new sightseeing plan Pn (including route Rp) presented to the user U are displayed on the communication terminal 10.

Then, in S112, the servers 20 determine whether the user U has selected one of the presented one or more sightseeing plans P. The one or more sightseeing plans P presented to the user U are at least one of one or more registered sightseeing plan Px presented in S104 and one or more new sightseeing plan Pn presented in S110. The user U selects one of the presented one or more sightseeing plans P by operating the communication terminal 10.

If S112 determination is Yes, the process proceeds to S114. In S114, the servers 20 determine whether or not the automated reservation of all the reservation targets X included in the sightseeing plan P (that is, the new sightseeing plan Pn or the registered sightseeing plan Px) selected in S112 can be performed. Consequently, when the automatic reservation of all the reservation targets X is enabled, the servers 20 execute the automatic reservation of all the reservation targets X in S116. Then, in S118, the servers 20 transmit, to the communication terminals 10, a notification indicating that the automated reservation of all the reservation targets X has been completed. The transmitted notification is displayed on the screen of the communication terminal 10.

In S120 following S118, the servers 20 determine whether or not the sightseeing plan P selected in S112 is a new sightseeing plan Pn. As a result, when the determination result is Yes, the process proceeds to S122, and when the determination result is No, the process proceeds to end.

In S122, the servers 20 execute the plan registering process described above. That is, the servers 20 register the new sightseeing plan Pn selected by the user U in the database 28.

On the other hand, when at least one automatic reservation of the reservation target X is not available in S112, the process proceeds to S124. In S124, the servers 20 modify the sightseeing plan P so as to exclude the reservation target X which is not able to be automatically reserved, and present the modified sightseeing plan P to the user U.

Then, in S126, the servers 20 determine whether the user U has approved the modified sightseeing plan P. As a result, when the determination result is Yes, the process proceeds to S116.

In addition, if the user U does not select (approve) any of the one or more sightseeing plans P presented by the user U in S112, the process proceeds to S128. If the user U does not approve the revised sightseeing plan P in S126, the process also proceeds to S128.

In S128, the servers 20 determine whether the sightseeing plan P not approved by the user U is a new sightseeing plan Pn. Consequently, when the determination result is Yes, the server 20 proposes the registration of the new sightseeing plan Pn to the user U in S130. On the other hand, if the determination is No, the process proceeds to the end.

In S132, the servers 20 determine whether the user U has approved (desired) the proposed new sightseeing plan Pn. As a result, when the determination result is Yes, the process proceeds to S122, while when the determination result is No, the process proceeds to end. When there are a plurality of new sightseeing plan Pn that have not been approved by the user U, the process from S128 to S132 is executed for each new sightseeing plan Pn.

Figure 4:
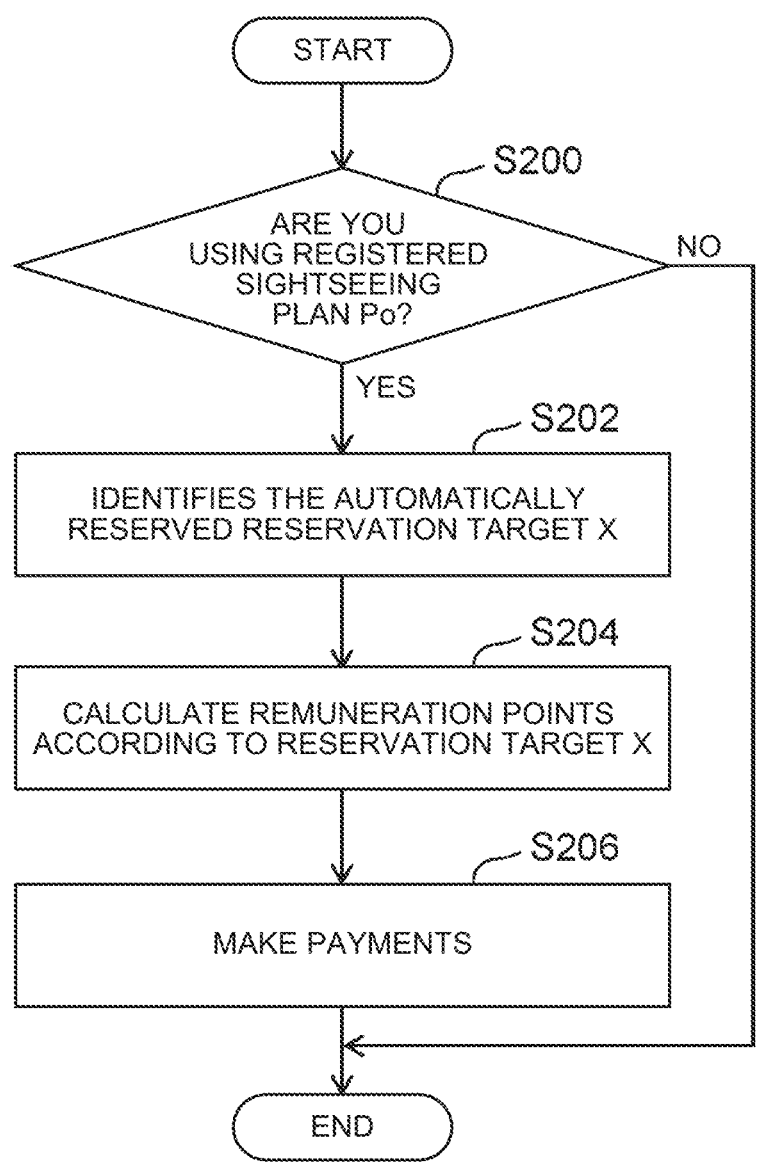
FIG. 4 is a flowchart illustrating a process related to the reward payment process according to the embodiment.

Next, FIG. 4 is a flowchart illustrating a process related to the reward payment process according to the embodiment. The processing of this flowchart is executed, for example, after the processing of the flowchart shown in FIG. 3 is executed.

In S200, the server 20 (the processor 24) determines whether or not the registered sightseeing plan Po (more specifically, the registered sightseeing plan Px) registered in the database 28 is used. For example, when the sightseeing plan P selected (approved) by the above-described S112 is the registered sightseeing plan Px, S200 determination is Yes. Consequently, the process proceeds to S202. On the other hand, when the sightseeing plan P selected (approved) by S112 is a new sightseeing plan Pn, S200 determination is No. As a result, the process proceeds to the end.

In S202, the servers 20 identify one or a plurality of reservation targets X for which an automatic reservation is executed among the reservation targets X included in the used registered sightseeing plan Po, for example, based on the execution history of the automatic reservation.

Then, in S204, the servers 20 calculate reward points corresponding to the identified one or more reservation targets X. More specifically, for example, a reward point corresponding to the reservation target X is calculated from a predetermined relationship. In a case where a plurality of specified reservation targets X are provided, a reward point is calculated for each individual reservation target X. Note that the reward of the reward point or the like may be constant regardless of the reservation target X.

Then, in S206, the server 20 executes a process of paying a reward point to a user related to the enrollment of the sightseeing plan P including the reservation target X specified in S202 (that is, the user U or other user who has posted the sightseeing plan P). More specifically, a reward such as a reward point for the user is borne by the reservation target X, and the server 20 performs the payment of the reward on behalf of the user through S206 process.

3. Effect

As described above, according to the present embodiment, a new sightseeing plan Pn is automatically generated based on the route planning information Irp of the trip T so as to include the desired stop-by spot Srq of the user U in response to the request of the user U who operates the communication terminal 10 (plan generation process). As described above, only when the user U enters the desired stop-by spot Srq, a new sightseeing plan Pn according to the preference of the user U is generated based on the route planning information Irp. The generated new sightseeing plan Pn is registered in the database 28 by the processor 24 (plan registering process). Therefore, it is possible to present a highly convenient sightseeing plan P to the traveler (user U) during the trip T for purposes other than tourism while reducing the time and troublesomeness of the traveler.

Further, according to the present embodiment, when one of the one or more sightseeing plans P (Pn or Px) presented to the user U is selected by the user U operating the communication terminal 10, the reservation target X included in the selected sightseeing plan P is automatically reserved by the processor 24 (automatic reservation process). Accordingly, it is possible to reduce the time and effort and the troublesomeness of the user U (traveler) related to the reservation associated with the tourism execution.

Further, according to the present embodiment, the reservation target X included in the sightseeing plan P selected by the user U may include an autonomous driving vehicle that matches the sightseeing plan P. Accordingly, when the user U uses the autonomous vehicle during tourism, the autonomous vehicle can be selected in accordance with the sightseeing plan P. Therefore, the satisfaction level of the user U with respect to the sightseeing plan P provided by the provision system 1 can be increased.

Further, according to the present embodiment, a process (reward payment process) of paying a reward from the reservation target X to a user (another user or user U) related to the registration of the sightseeing plan P including the reservation target X that is automatically reserved is executed. Accordingly, it is possible to provide the user with an incentive to generate and register (post) a good sightseeing plan P. As a result, since the number and the quality of the sightseeing plan P are improved, the attractiveness of the sightseeing plan provision system 1 can be improved.

What is claimed is:

1. A sightseeing plan provision system, comprising:
   a communication terminal configured to be operated by a user who is on a trip for a non-sightseeing purpose, the communication terminal being connectable with an autonomous vehicle used by the user during the trip and being configured to generate a route of the trip and control the autonomous vehicle to move the user based on the route of the trip; and
   a server that includes a processor and a storage device, and is configured to present a sightseeing plan to the user,
   wherein
   the processor is configured to
      obtain route planning information of the route of the trip and information of the autonomous vehicle used by the user,
      automatically generate a new sightseeing plan based on the route planning information of the trip so as to include a desired stop-by spot of the user in response to a request of the user who operates the communication terminal,
      register the new sightseeing plan in a database of the storage device, and
      cause the communication terminal to simultaneously present the new sightseeing plan registered in the database of the storage device and a registered sightseeing plan previously generated and registered in the database of the storage device,
   the new sightseeing plan including a first route, the registered sightseeing plan including a second route that diverges from the route of the trip and then merges back into the route of the trip after passing through the desired stop-by spot,
   the communication terminal is configured to, in response to one of the new sightseeing plan or the registered sightseeing plan being selected by the user via operating the communication terminal, control the autonomous vehicle to move the user based on the first route of the new sightseeing plan or the second route of the registered sightseeing plan, which is selected by the user,
   the processor is configured to:
      generate one or more further new sightseeing plans including the desired stop-by spot in response to a request from another user or a further request from the user, and
      register the one or more further new sightseeing plans in the database of the storage device,
   the processor is configured to, in response to one of the further new sightseeing plans being selected by the user via operating the communication terminal, automatically reserve a first reservation target included in the selected further new sightseeing plan, and
   the first reservation target includes a further autonomous vehicle that matches the selected further new sightseeing plan.

2. The sightseeing plan provision system according to claim 1, wherein the processor of the server is configured to execute a process of paying a reward from the first reservation target to the another user or the user related to registration of the further new sightseeing plan including the first reservation target that is automatically reserved.

3. The sightseeing plan provision system according to claim 1, further comprising:
   the processor is configured to, in response to one of the new sightseeing plan or the registered sightseeing plan being selected by the user via operating the communication terminal, automatically reserve a second reservation target included in the selected sightseeing plan.

4. The sightseeing plan provision system according to claim 3, wherein the second reservation target includes another further autonomous vehicle that matches the selected sightseeing plan.

5. The sightseeing plan provision system according to claim 4, wherein the processor of the server is configured to execute a process of paying a reward from the second reservation target to the user related to registration of the selected new sightseeing plan including the second reservation target that is automatically reserved.

6. A sightseeing plan provision method of providing a sightseeing plan to a user who is on a trip for a non-sightseeing purpose, the sightseeing plan provision method comprising:
   generating, by a communication terminal connected with an autonomous vehicle used by the user during the trip, a route of the trip;
   controlling, by the communication terminal, the autonomous vehicle to move the user based on the route of the trip;
   obtaining route planning information of the route of the trip and information of the autonomous vehicle used by the user;
   automatically generating a new sightseeing plan based on the route planning information of the trip so as to include a desired stop-by spot of the user in response to a request of the user who operates the communication terminal;

registering the new sightseeing plan in a database;

simultaneously presenting the new sightseeing plan registered in the database and a registered sightseeing plan previously generated and registered in the database, the new sightseeing plan including a first route, the registered sightseeing plan including a second route that diverges from the route of the trip and then merges back into the route of the trip after passing through the desired stop-by spot; and in response to one of the new sightseeing plan or the registered sightseeing plan being selected by the user via operating the communication terminal, controlling the autonomous vehicle to move the user based on the first route of the new sightseeing plan or the second route of the registered sightseeing plan, which is selected by the user, wherein the sightseeing plan provision method further comprises:
in response to one of the new sightseeing plan or the registered sightseeing plan being selected by the user via operating the communication terminal, automatically reserving a reservation target included in the selected sightseeing plan, and the reservation target includes a further autonomous vehicle that matches the selected sightseeing plan.

7. The sightseeing plan provision method according to claim 5, further comprising: executing a process of paying a reward from the reservation target to the user related to registration of the selected sightseeing plan including the reservation target that is automatically reserved.

8. The sightseeing plan provision method according to claim 6, further comprising:

generating one or more further new sightseeing plans including the desired stop-by spot in response to a request from another user or a further request from the user;

registering the one or more further new sightseeing plans in the database; and in response to one of the further new sightseeing plans being selected by the user via operating the communication terminal, automatically reserving a further reservation target included in the selected further new sightseeing plan.

9. The sightseeing plan provision method according to claim 8, further comprising:

executing a process of paying a reward from the reservation target to the another user or the user related to registration of the selected further new sightseeing plan including the further reservation target that is automatically reserved.

10. The sightseeing plan provision method according to claim 9, wherein the further reservation target includes another further autonomous vehicle that matches the selected further new sightseeing plan.

\* \* \* \* \*